United States Patent [19]

Wadensten

[11] 4,280,616

[45] Jul. 28, 1981

[54] VIBRATORY BELT CLEANER WITH AUXILIARY VIBRATORY RESONANCE

[76] Inventor: Theodore S. Wadensten, P.O. Box 8, Stilson Rd., Wyoming, R.I. 02898

[21] Appl. No.: 18,589

[22] Filed: Mar. 8, 1979

[51] Int. Cl.³ .............................................. B65G 45/00
[52] U.S. Cl. ..................................... 198/499; 198/494
[58] Field of Search ............... 198/494, 495, 496, 497, 198/498, 499

[56] References Cited

U.S. PATENT DOCUMENTS

| | | | |
|---|---|---|---|
| 2,647,619 | 8/1953 | Green | 198/494 |
| 2,885,069 | 5/1959 | Bowen | 198/494 |
| 3,047,133 | 7/1962 | Searles | 198/498 |
| 3,802,554 | 4/1974 | Paulsen et al. | 198/494 |
| 4,042,102 | 8/1977 | Wadensten | 198/494 |

FOREIGN PATENT DOCUMENTS

| | | | |
|---|---|---|---|
| 2810931 | 9/1978 | Fed. Rep. of Germany | 198/494 |
| 1397714 | 6/1975 | United Kingdom | 198/494 |

Primary Examiner—Jeffrey V. Nase
Attorney, Agent, or Firm—Ralph R. Roberts

[57] ABSTRACT

The cleaning of conveyor belts has been a problem since their widespread acceptance and the adoption of belts for the transporting of materials. Many materials so conveyed have a tackiness and/or an affinity or attraction for the outer surface of a conveyor belt. When this attraction occurs, the cleaning or removal of this material from the surface of the belt is a problem. Many methods have been used for removing this material or residue adhering to the conveyor belt. In the present invention there is shown a vibration device which is attached so as to vibrate the lower belt extent. This apparatus is carried on the under and inner side of the conveyor belt so that a vibration occurs shortly after the discharge of the material from this belt. Shortly after passing over the discharge roller the conveyor belt is brought in way of a vibrated resonant roller and/or scraper in contact with the outer surface whereby any residual material on the exterior of the belt is loosened and knocked free by means of the localized vibrations. The weight of the vibrator and the roller is not excessive and is locally applied to the inner side and under extent of the belt. A resonant vibration is induced into the lower extent of the belt by providing a vibrated resonant roller and/or scraper which in most cases engages the outer surface of the belt near the discharge roller. The main vibrated roller is a short distance further from the discharge roller and engages the inner surface of the belt. The vibratory unit induces vibrations in both the inner roller and the resonant roller and/or scraper.

24 Claims, 23 Drawing Figures

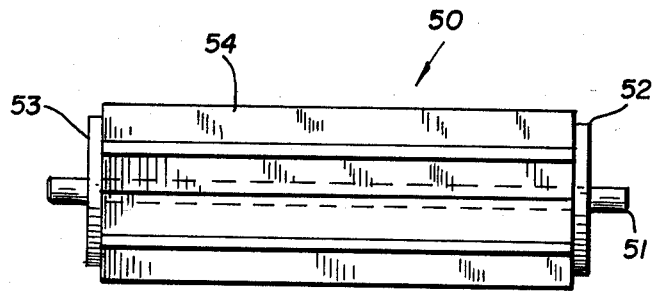
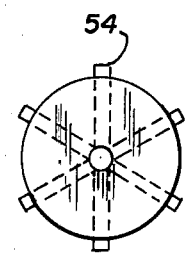
FIG. 3A       FIG. 3B
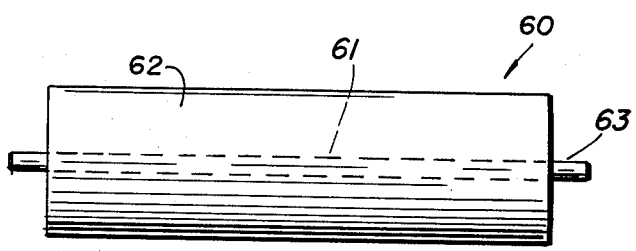
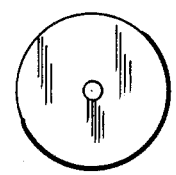
FIG. 4A       FIG. 4B
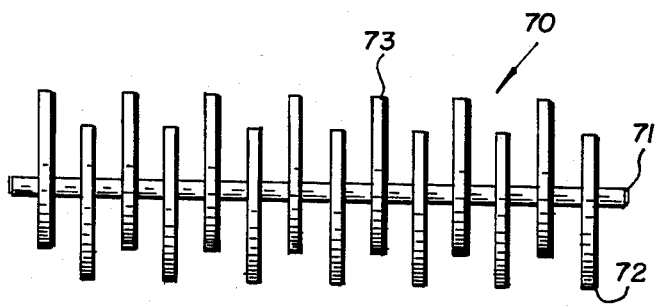
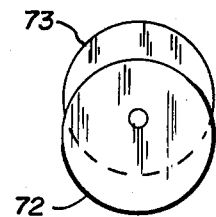
FIG. 5A       FIG. 5B

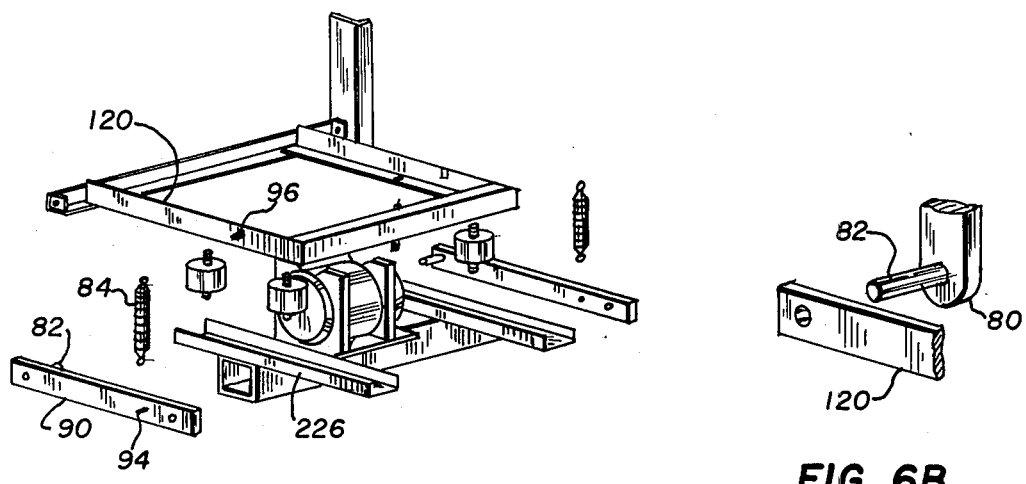
FIG. 7C
FIG. 6B
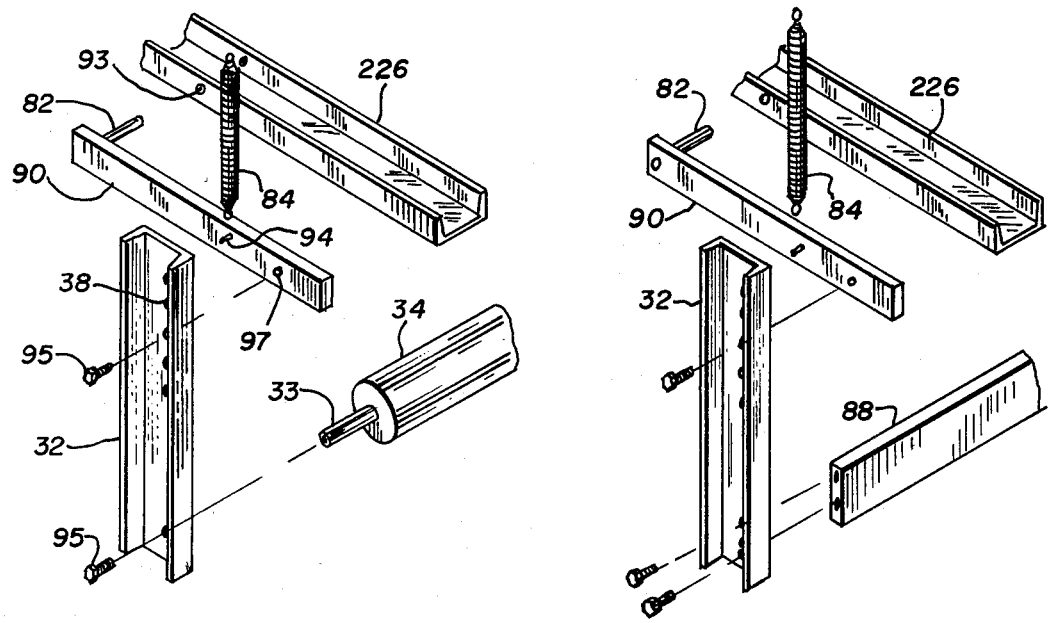
FIG. 7D
FIG. 7E

VIBRATORY BELT CLEANER WITH AUXILIARY VIBRATORY RESONANCE

CROSS REFERENCE TO RELATED PATENT

To the extent applicable this application is an improvement of my U.S. Pat. No. 4,042,102 as issued on Aug. 16th, 1977 and based on my U.S. patent application Ser. No. 694,379, filed on June 9th, 1976.

BACKGROUND OF THE INVENTION

1. Field of the Invention

With reference to the classification of art as established in the United States Patent and Trademark Office the present invention pertains to the Class entitled, "Conveyors, power driven" (Class 198) and particularly to the subclass entitled, "cleaners" (subclass 494).

2. Description of the Prior Art

Scrapers, brushes and spoked wheels imparting a fixed amount of vibration to a conveyor belt are shown in prior art devices. Insofar as is known, these prior art devices do not provide an adjustability or high frequency vibrations which are applied to an above and below roller which engages the conveyor belt as provided in the present device. It is anticipated that either air or electric vibrators may be provided and that the cycle of vibrations imparted to the belt is from twelve hundred to nine thousand vibrations per minute.

Among the conveyor belts commonly used to transport materials, particularly up and down slopes, are belts having toothed or corrugated surfaces. Scrapers and/or brushes often are unsatisfactory in removing such material from these belts. Among the many reasons is the size and fragile construction and/or composition of the conveyed material. The vibrating apparatus of this invention is particularly useful for removing attracted material from an outer surface of the conveyor belt. The frequency and amplitude of the vibrator is adjusted to accommodate the particular conveyed material and the conveyor belt and surface.

SUMMARY OF THE INVENTION

This invention may be summarized at least in part with reference to its objects.

It is an object of this invention to provide, and it does provide, a variable speed vibrator which transmits vibrations to upper and lower rollers both of which are free-turning, and with both rollers in contact with the lower extent of the conveyor belt. The vibratory cleaning apparatus is carried by pillow blocks so that it is in gravitational contact with the lower extent of the conveyor belt.

It is a further object of this invention to provide, and it does provide, a vibrating roller which engages the inside of a conveyor belt on the lower, inner extent thereof with the vibrating roller and vibrator carried on the end of a pair of swinging arms. This vibrator is adjustable from twelve hundred to nine thousand cycles per minute. Carried by this roller apparatus is an arm extension also carrying a resonant roller and/or scraper which is also vibrated by the vibrator. There is also a slight tension applied to that lower conveyor belt portion between the discharge pulley and the vibrating roller when and as it engages the inner surface of the conveyor belt.

This invention provides a vibrating apparatus which may be adjusted to a desired frequency and force of from twelve hundred to nine thousand cycles per minute. These vibrations are transmitted to a free-turning roller which is in gravitational engagement with the inside of the conveyor belt on the lower returning extent of this belt and near to the discharge pulley. The vibrator is carried by a bracket and on fixed forwardly extending arms which on their free and outer right ends carry downwardly extending arms which extend below the return extent of the conveyor belt. On these downwardly extending arms is mounted a resonant roller and/or scraper which engages the outer surface of the coveyor belt to jar loose and remove that material adhering to the conveyor belt surface. The lower conveyor belt portion between the conveyor discharge roller and the vibrating roller in engagement with the inside of the conveyor belt is brought into a light tension by engaging the outer surface of the belt with a resonant roller and/or scraper or by the weight of the pillow block supported vibrated apparatus.

The fixed arm extensions of the vibrating apparatus extend forwardly toward the discharge roller of the conveyor. From these ends the downwardly extending arms are adjustable both for distance toward or away from this conveyor roller and for distance toward or away from the fixed extensions. The resonant roller and/or scraper is secured to these extensions. In certain applications this roller may be arranged so as to engage the inner surface of the belt when the material conveyed is particularly adhesive or sticky such as wet clay or cement.

In addition to the above summary the following disclosure is detailed to insure adequacy and aid in understanding of the invention. This disclosure, however, is not intended to cover each new inventive concept therein no matter how it may later be disguised by variations in form or additions of further improvements. For this reason there has been chosen specific embodiments of a vibrating assembly as adopted for use with a conveyor belt and showing a preferred means for vibrating the freely turning roller and a resonant roller and/or scraper. These specific embodiments have been chosen for the purposes of ilustration and description as shown in the accompanying drawings wherein:

BRIEF DESCRIPTION OF THE DRAWINGS

FIG. 3A represents a side view, partly diagrammatic, of a resonant roller having six blades;

FIG. 3B represents an end view, partly diagrammatic, of the bladed resonant roller of FIG. 3A;

FIG. 4A represents a side view, partly diagrammatic, of a resonant roller having a smooth cylindrical outer surface;

FIG. 4B represents an end view, partly diagrammatic of the smooth cylindrical roller of FIG. 4A;

FIG. 5A represents a side view, partly diagrammatic, of a resonance having eccentric discs alternately arranged and secured to a shaft;

FIG. 5B represents an end view, partly diagrammatic, of the resonant roller with the discs of FIG. 5A;

FIG. 6B represents a fragmentary partially exploded isometric view and showing an alternate means of disposing of a pivot pin;

FIG. 7C represents a partially fragmentary and isometric view of a belt cleaning apparatus similiar to that of FIGS. 1A, 1B and 2 but with an auxillary pivoted arm;

FIG. 7D represents a partly fragmentary and isometric view of the apparatus of FIG. 7C with a roller attached to the downwardly depending arms as in FIGS. 1A and 1B;

FIG. 7E represents a partly fragmentary and isometric view of the apparatus of FIG. 7C with a scraper attached to the downwardly extending arms as in FIG. 7A;

Figure 1B:
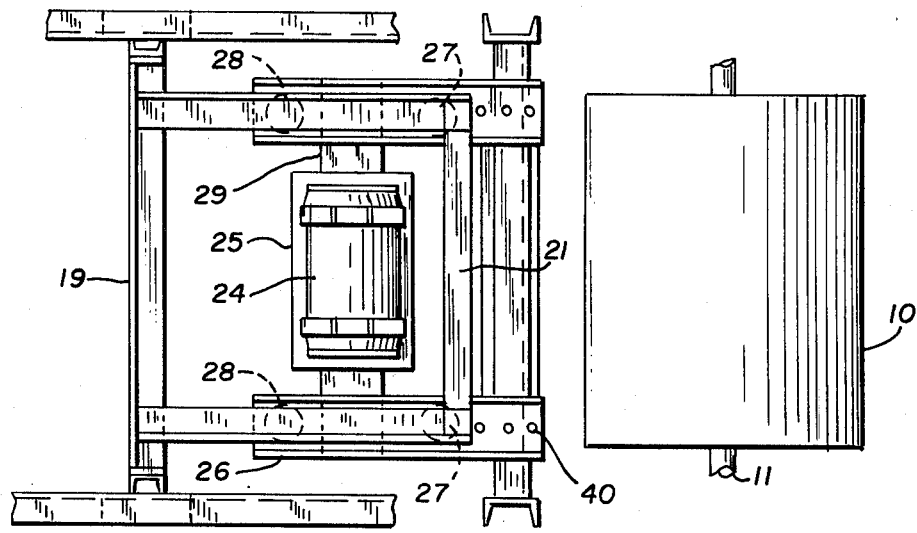
FIG. 1B represents a plan view of the vibratory apparatus of FIG. 1A and showing figuratively the spacing and positioning of the several components.

In the following description and in the claims various details are identified by specific names for convenience. These names are intended to be generic names for convenience. These names are intended to be generic in their application. Corresponding reference characters refer to like members throughout the several figures of the drawings.

The drawings accompanying, and forming part of, this specification disclose details of construction for the purpose of explanation but structural details may be modified without departure from the concept and principles of the invention and the invention may be incorporated in other structural forms than shown.

Figure 1A:
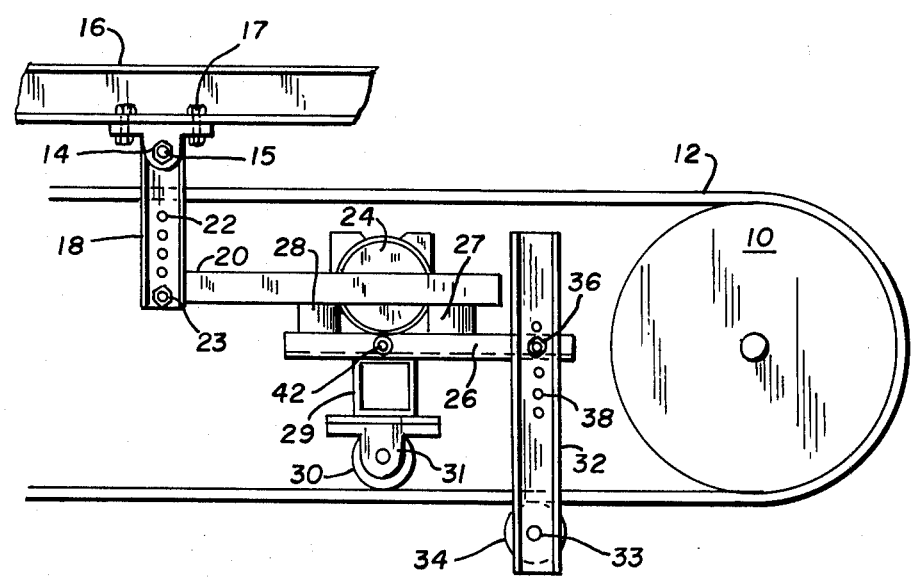
FIG. 1A represents a fragmentary, side view showing the discharge pulley end of a belt conveyor with the vibratory belt cleaning apparatus and resonant roller arranged to remove problem material from the outer surface of a conveyor belt.
Figures 2, 9D:
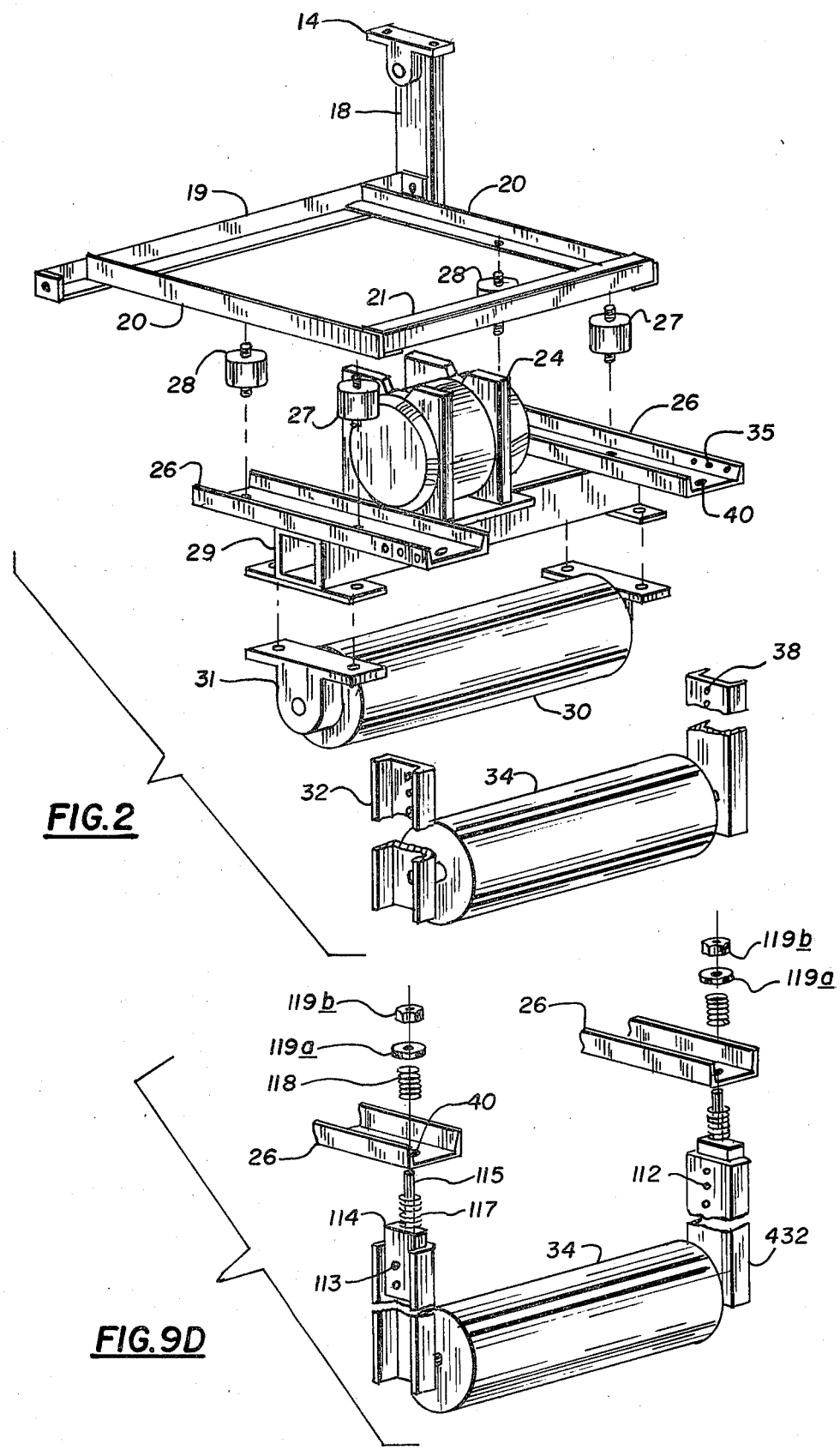
FIG. 2 represents a partially exploded isometric view of the belt cleaning apparatus of FIGS. 1A and 1B.
FIG. 9D represents a fragmentary isometric view showing yet another spring means or arrangements for urging and maintaining the resonant roller or scraper in engagement with the underside of the convey or belt.

Apparatus of FIGS. 1A, 1B and 2

Referring now to the drawings and in particular to FIGS. 1A, 1B, and 2 there is shown in detail a preferred vibratory belt cleaner with a resonant roller carried so as to engage and clean the outer surface of the conveyor or belt. As seen a discharge pulley 10 is journalled and turns with or on a shaft 11. A conveyor belt 12 runs over pulley 10 and the return or lower extent of this belt is the portion to be cleaned. A pillow block 14 carries a bolt or pin 15 and is secured to a conveyor support frame 16 by means of bolts and nuts 17. Pin 15 carries the downwardly extending arms 18.

These arms carry a top frame which is isolated in a large part from the vibrations which activate the cleaning. This top frame includes a head member 19 which is adapted to extend between vertical member 18. Forwardly extending arms 20 are attached to the head member 19 and at their right ends to transverse member 21.

A plurality of holes 22 are formed in each of the downwardly extending arms 18 so that by means of bolts or pins 23 this top frame may be adjustably positioned to bring the top frame into a more-or-less parallel position and condition with the belt 12 and frame 16.

A vibrator 24 which may be electric, pneumatic or hydraulically activated is carried on a base plate 25 as in FIG. 1B or may have its own base portion. This vibrator may have an operating cycle of twelve hundred to nine thousand cycles per minute.

Arms 26 are disposed on each side of the vibrator and by means of vibration isolators 27 and 28 are secured to the arms 20 of the top frame. These forwardly extending arms 26 are preferably brought no closer to the dischage pulley 10 than two inches. A tubular member 29 is shown as carrying the vibrator and a freely turning roller 30. This member 29 is secured to arms 26 as by bolts or welding. Roller 30 is carried by at each end by pillow blocks 31.

Downwardly depending arms 32 has on its lower end an aperature or bearing for a shaft 33 of a resonant or scraper roller 34. A series of holes 35 in arms 26 accept a bolt 36 which also passes through holes 38 in arm 32. An angle bracket or similar device not depicted cooperates with a series of holes 40 to insure that the positioned arms 32 are secured in the adjusted position to maintain roller 34 in the desired front-to-back position. These depending arms are adjustable in their vertical positioning so that this resonant roller 34 as it rides under the belt 12 applies some upward pressure but not enough pressure to bend or kink the belt. Pins or bolts are placed in holes 38 to secure the arms 32 in the desired attitude and extension so that roller 34 is slightly in contact with the outer surface of the belt 12. An eye bolt 42 may be provided to enable a cable to be led from the vibratory cleaner to frame 16 to limit the downward travel of rollers 30 and 34 against failures or disassembly of the apparatus.

Assembly and Adjustment of the Apparatus of FIGS. 1A, 1B and 2

Assuming that the conveyor frame 16 is arranged as shown in FIG. 1A, it is desirable to bring the arms 20 to a substantially parallel condition with arms 26 substantially parallel to arms 20 extending through the axis of the discharge pulley 10. The vertical adjustment holes 22 in members 18 are used in the adjustment of the arms 20 and the frame therewith up and down until said frame is substantially parallel to the bottom extent of the conveyor belt 12. Pillow blocks 14 are temporarily secured to frame 16 by means of C-clamps, not shown, so that the distal or right end of the arms 26 are about two inches from the discharge pulley 10. With this belt cleaning apparatus mounted as described above, the vibrator 24 is started at a medium speed and amplitude. The conveyor belt 12 is in a non-operating or moving condition. The vibrations induced into the lower extent of the belt is felt by placing a hand on a lower extent of the belt 12.

The vibrator 24 is now stopped and the C-clamps are loosened. This cleaning apparatus with the vibrator 24 and roller 20 is moved about six inches further to the left from the discharge pulley 10. The pillow blocks 14 are again temporarily clamped to the frame and the vibrator 24 is again started at the same amplitude and speed. The vibrations in the belt are again felt. Again the C-clamps are loosened and the cleaning apparatus is moved into position six inches further to the left and a retest of the vibrations is made on the lower extent of the belt 12. The operator selects the position where the belt reacts with the greatest amplitude and the belt apparatus is secured to the frame by a bolting of the pillow blocks 14 in position to the frame 16. After the belt cleaning apparatus has been secured, the scraper roller 34 is brought into a light engagement with the lower outer surface of the belt 12. A use of the mounting holes 38 and the bolts 36 allows the scraper roller 34 to be adjusted to lightly engage the lower extent of the belt to bring a slight tension in this section of belt. In one of the three holes 40, the scraper roller arms 32 are positioned and the vibrations induced in the belt are evaluated. The belt 12 is left in a non-moving condition while the vibrator 24 is started. The operator rests a hand on the belt to feel the vibrations in the belt. The scraper roller 34, as supported by the arms 32, is then moved to a new set of mounting holes in the group 40. With vibrator 24 in action, a test of the vibration of the belt is made. Finally the arms 32 are moved to the last of the three sets of holes in group 40 and a re-test is made of the vibrations in belt 12. The scraper roller assembly provided by roller 34 is mounted at that position where the most vibration is induced into the lower extent of the belt. It may be necessary to adjust the arms 32 to provide the desired tension of roller 34 against the belt 12.

If additional vibration force is required, this force can be increased by changing the setting of the eccentrics of the vibrator 24. A steel cable, not shown, is attached through I-bolts 42 to the frame 16 as a safety precaution so unwanted and excessive force or weight is not applied to the belt 12 in case of wear or like failure.

Resonant Roller of FIGS. 3A and 3B

Referring now to the drawings and to FIGS. 3A and 3B there is shown a resonant roller 50 which is constructed with six blades. A shaft 51 has end portions which are free-turning in bearings secured to arms 32. End discs 52 and 53 are depicted and between them are like blades 54 which preferably are metal plates. These blades are secured at their ends to discs 52 and 53 and to the shaft 51 as by welding.

Resonant Roller of FIGS. 4A and 4B

As depicted, the resonant roller of FIGS. 4A and 4B includes a roller 60 and a shaft 61 in a solid or tubular member 62 which provides a smooth outer surface with protruding shaft journals 63. These journals 63 are carried in bearings in and on the end of the arms 32.

Resonant Roller of FIGS. 5A and 5B

In FIGS. 5A and 5B there is shown a resonant roller with eccentric discs. A roller assembly is generally identified as 70 and includes a shaft 71 and a plurality of eccentric discs 72 and 73. These discs are spaced apart substantially equally and then are welded to the shaft 71. The shaft may be square or rectangular in shape and appropriately formed apertures are formed in each disc to assist in the orienting and welding of these discs in place after which or before which the ends of the shaft 71 are turned down to fit bearings in and on the end of the arms 32.

Figure 6A:
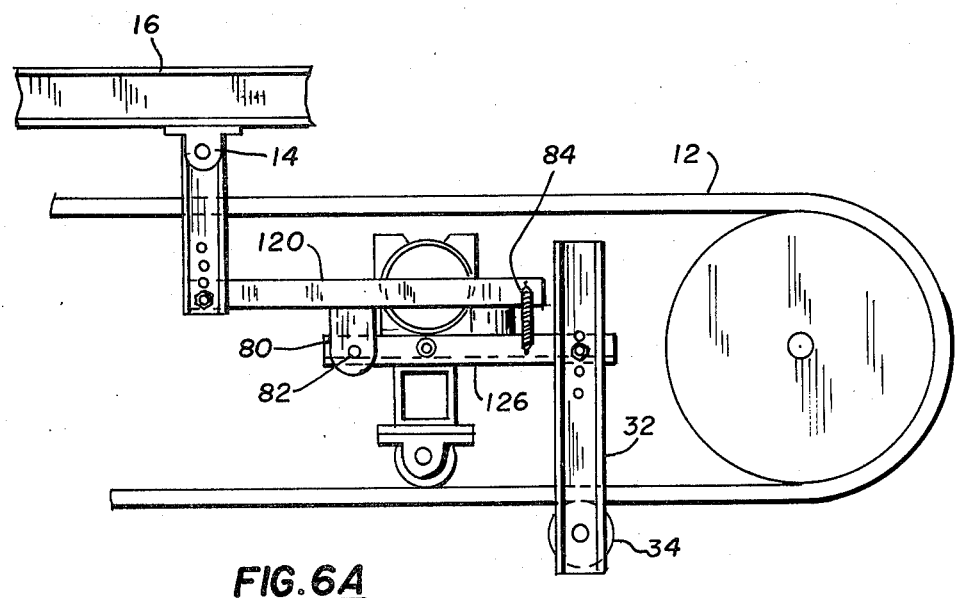
FIG. 6A represents a side view partly diagrammatic, of the vibratory cleaning apparatus of FIGS. 1A, 1B and 2 and showing the resonant roller and arm apring biased into position.

Description of the Belt Cleaner of FIGS. 6A and 6B

Referring next to the drawings and the embodiments as shown in FIGS. 6A and 6B, it is to be noted that the top frame is slightly changed to include not only transverse members as in FIG. 2 but also changed or alternate side members 120 are supplied. Each of the side members 120 are secured pivot supports 80. As shown in FIG. 6A this pivot support is on the outside of arm member 126 forming a part of the vibration frame. Pivot pin 82 engages and pivotally supports one end of arm side member 126. A pair of springs 84 extend from the right end of the top frame arms 120 to the arm 126 to urge upwardly the roller 34 and the right end of the vibrated frame and arms 32. In the fragmentary view of FIG. 6B it is to be noted that the pivotal support 80 may have the pivot pin extending outwardly so as to retain the arm 126 outside the supports 80.

Figure 7A:
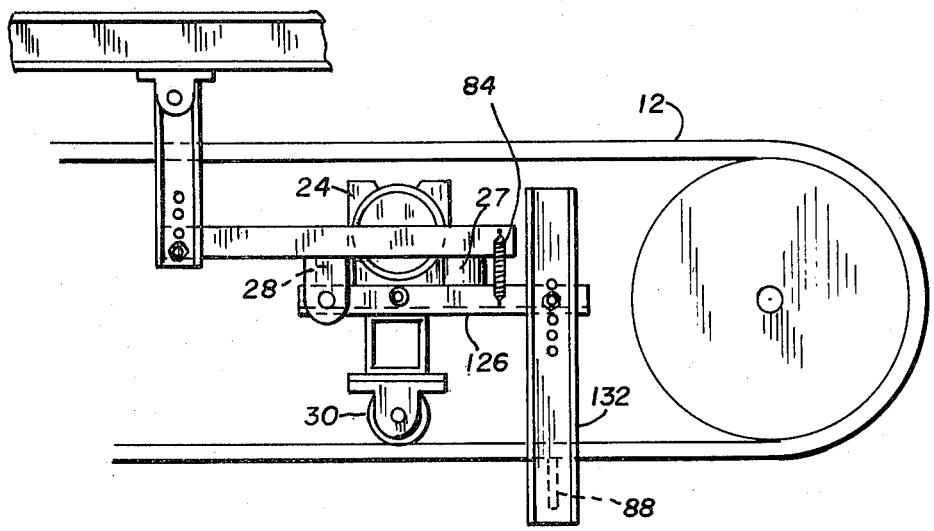
FIG. 7A represents a side view, partly diagrammatic, of the vibratory cleaning apparatus of FIG. 6A but with a scraper rather than a resonant roller.

Description of the Belt Cleaner of FIG. 7A

Referring next to FIG. 7A and the belt cleaning apparatus as shown therein, a cleaner much like that of FIG. 6A includes a pair of pivoted arms 126 which is biased upwardly by springs 84. Downwardly extending arms 132 carry a scraper blade 88 rather than a roller such as 34, shown in FIG. 6A. Springs 84 draw the scraper blade 88 into engagement with the outer surface of the returning conveyor belt 12. As above described in conjunction with FIG. 6B the pivot pin 82 may be turned outwardly to carry the side arm member 126. The downwardly extending arms 132 carry the scraper blade 88.

Figure 7B:
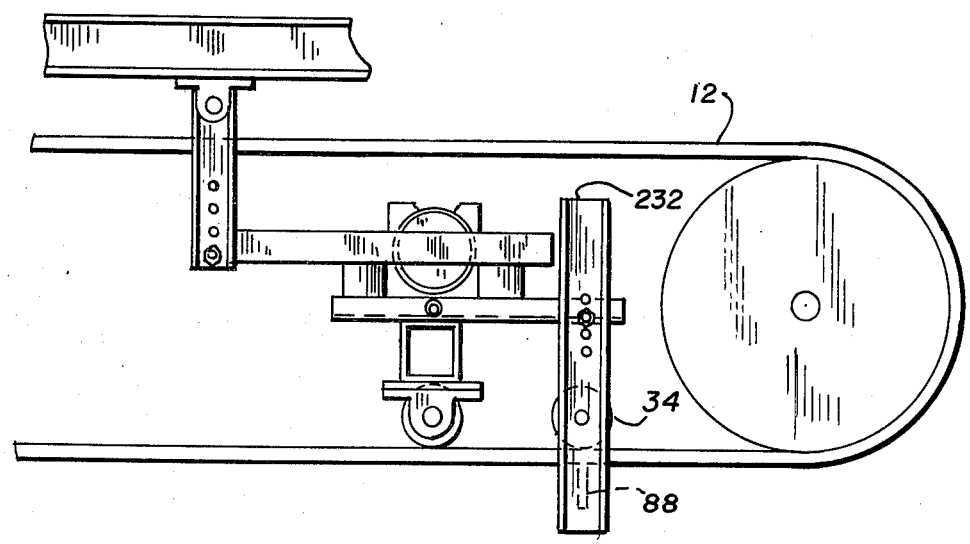
FIG. 7B represents a side view, partly diagrammatic, of the vibratory cleaning appartus of FIG. 7A with a resonant roller carried above the scraper.

Description of the Belt Cleaner of FIG. 7B

Referring now to the diagrammatic side view of FIG. 7B, there is depicted a belt cleaning apparatus similar to that of FIG. 7A in which a scraper 88 is secured to downwardly extending arms 232. A roller 34 is carried above scraper 88 so as to engage the inner surface of belt 12. A spring 84 may or may not be used in this arrangement. The final arrangement is determined by the material to be conveyed.

Description of the Belt Cleaner of FIG. 7C

Referring next to FIG. 7C it is to be noted that the roller 34 of FIG. 6A, the scraper 88 of FIG. 7A or a combination as in FIG. 7B may be carried on auxiliary pivoted arms 90 which have inturning pivot pins 82 journalled in holes 93 in arm members 226. A tension spring 84 has its lower hook end secured or affixed to a hole 94 in arm 90 and its upper hook end is secured or affixed to a hole 96 in arm 120. The depending arm 32 is mounted in hole 98 in arm 90. A scraper 88 and/or roller 34 is carried by the depending arms. FIG. 7D shows a roller 34 carried by arms 32 by shaft 33 and cap crew 97. A like cap screw 95 passes through one of the holes 38 and into threaded hole 97 to retain arm 32. In FIG. 7E a scraper 88 is secured to the lower end of arm 32.

Figure 8:
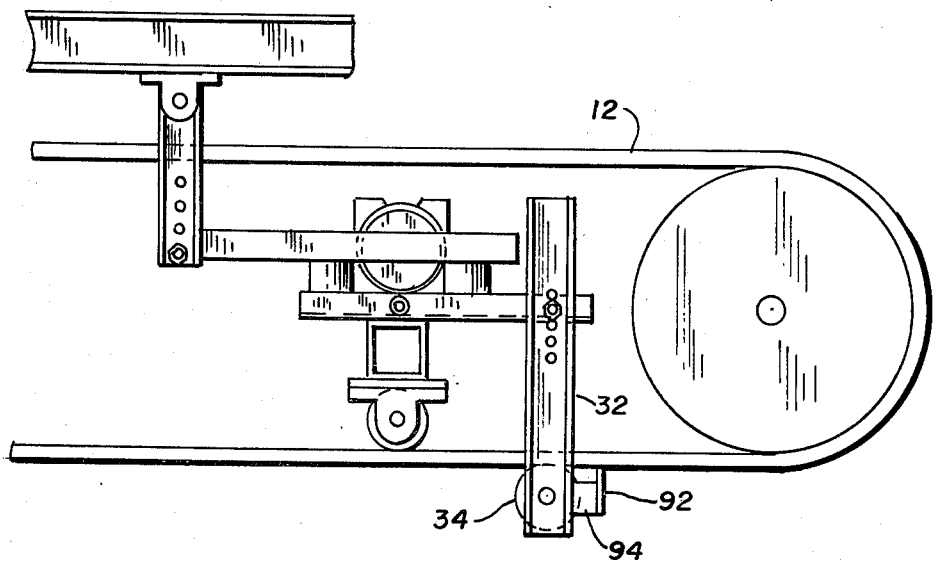
FIG. 8 represents a side view, partly diagrammatic, of the vibratory cleaning apparatus of FIGS. 1A and 1B and showing the resonant roller with an additional scraper member carried on the depending arm.

Description of the Belt Cleaner of FIG. 8

Referring next to the diagrammatic side view of FIG. 8, there is depicted the belt cleaning apparatus of FIG. 1 but with a scraper blade 92 and with a scraper 94 at each end of this blade. This blade is secured to depending arms 32 and as the belt 12 is advanced both the roller 34 and the scraper 92 are vibrated and lightly engage the lower outer surface of belt 12.

Figure 9B:
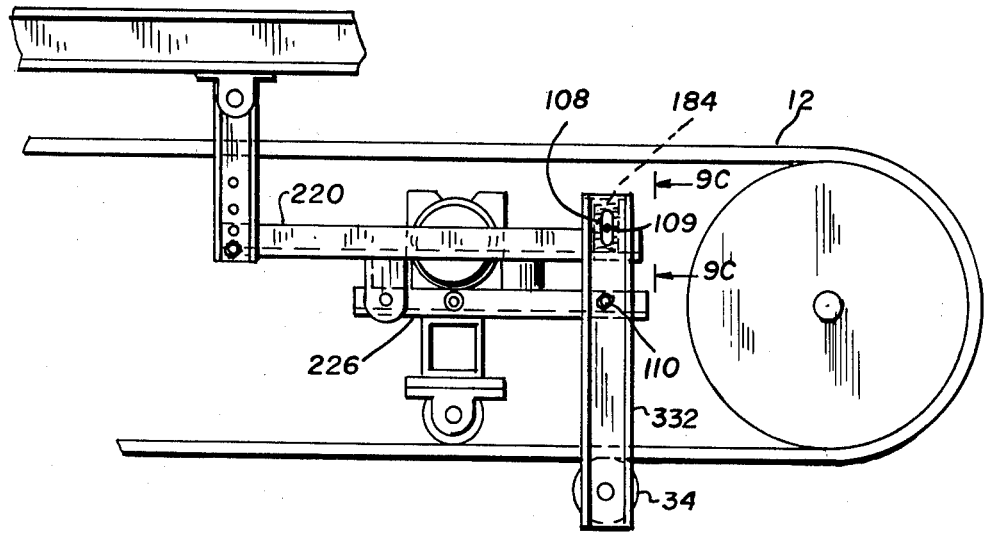
FIG. 9B represents a side view, partly diagrammatic, of the vibratory cleaning apparatus of FIGS. 1A and 1B with the resonant roller arm spring biased with a compression spring.
Figure 9C:
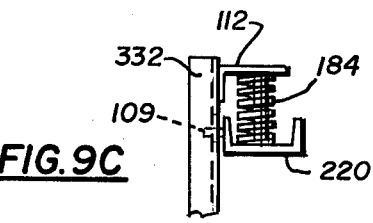
FIG. 9C represents a fragmentary sectional view taken on the line 9C—9C of FIG. 9B and showing an alternate spring means for urging the resonant scraper upwardly.
Figure 9A:
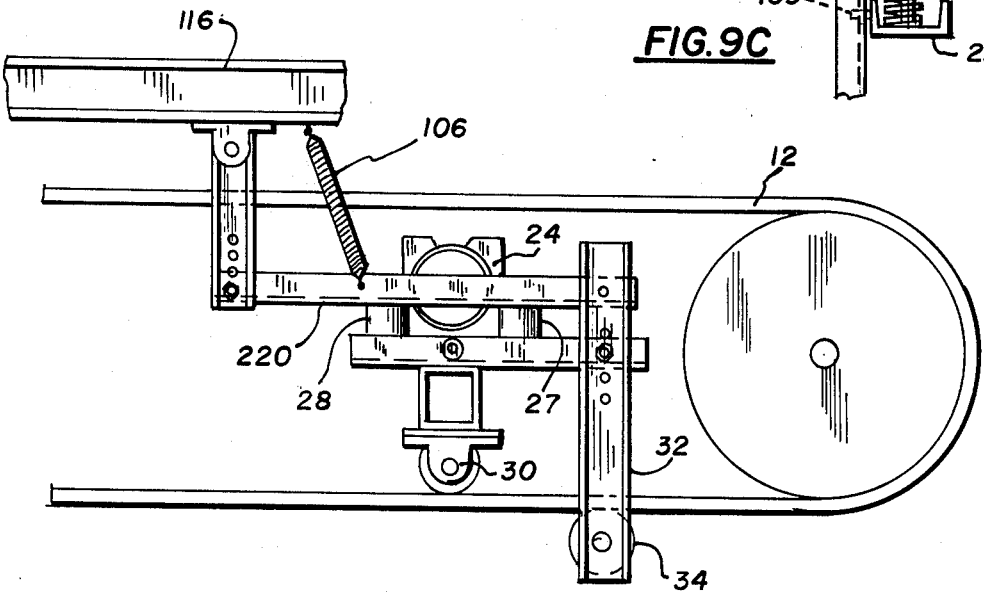
FIG. 9A represents a side view, partly diagrammatic, of the vibratory cleaning apparatus of FIG. 1A and showing a tension spring by which the pivoted apparatus is partially supported.

Description of the Belt Cleaner of FIG. 9A

Referring next to the diagrammatic side view of the apparatus of FIG. 9A wherein from a frame 116 a tension spring 106 extends to a horizontal arm or arms 220 to reduce the gravitational force or load on belt 12. This spring or springs 106 to the extent necessary, supports and lifts the vibration apparatus so that roller 30 does not carry the belt 12 downward a greater than desired amount.

Description of the Belt Cleaner of FIGS. 9B and 9C

Referring next to the diagrammatic side view of the belt cleaning apparatus as shown in FIGS. 9B and 9C, the cleaner includes the vibrator and other components as in FIG. 6A. Instead of a tension spring 84, as seen in FIG. 6A, there is provided a compression spring 184 which is selected to provide the desired upward bias. Vertical arms 332 are guided so as to move in a preselected path. As shown, a slot 108 in arm 332 is engaged by pin 109 secured to horizontal arm 220. A pivot pin 110 is shown as connecting arms 226 and arms 332. If desired, the arm 332 may be fixed to arm 226 and spring 184 then is adapted to lift arms 332 and resonant roller 34.

As seen in the fragmentary view of FIG. 9C there is shown arm 332 which has a locally attached angle 112. This angle portion 112 also retains the upper end of the compression spring 184. The lower ends of this spring is preferably seated in the channel portion of the arm 220. Pin 109 is secured to the side of arm 220 to move in slot 108.

Description of the Belt Cleaner of FIG. 9D

Referring next to the fragmentary isometric view of FIG. 9D there is shown an alternate mounting means for supporting depending vertical arms 432. As depicted, these arms are outwardly turned channels having a series of holes 112 formed there through. Like sized holes 113 are formed in block members 114. In and to the upper end of block member 114 is secured a stud 115. A spring 117 is a compression type and is interposed between the top of the block 114 and the underside of arm member 26. The stud 115 extends through and retains this or these springs.

After the blocks 114 have been brought to the arms 26 they are passed through on the series of holes 40 and then a compression spring 118 is placed over stud 115. This spring 118 rests on top of arm 26 and then a washer 119a is placed on top of spring 118 and a nut 119b is mounted and adjusted on the threaded end of the stud 115. After the assembly to the arms 26 the blocks 114 are secured to the depending arms 432 by cap screws, bolts or pins, not shown, and utilizing holes 112 and 113.

A roller 34 is shown but a blade or a combination of blade and roller may be employed with the depending arms 432 to provide a spring biased resonant scraper means.

Figure 9F:
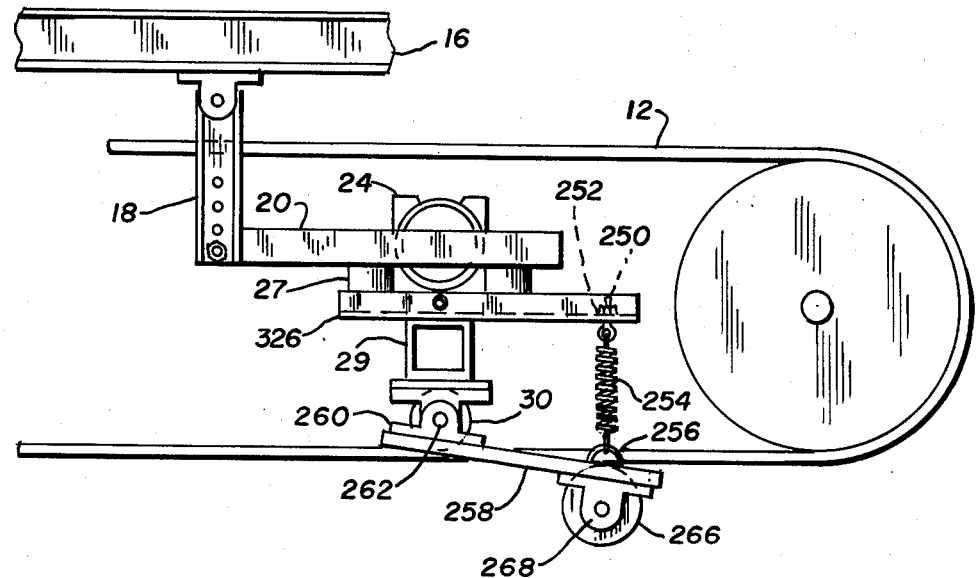
FIG. 9F represents a side view of the apparatus of FIG. 9E but with a roller instead of a scraper blade installed below the conveyor belt.
Figure 9E:
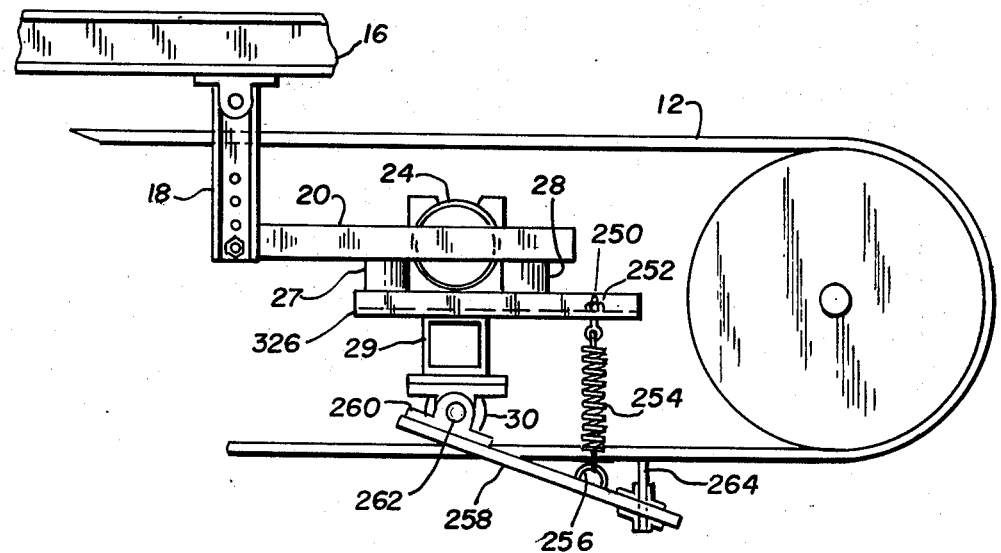
FIG. 9E represents a fragmentary side view, partly diagrammatic, and showing a pivoted support at and on the vibrated roller and a spring-biased scraper blade carried below the return belt.

Description of the Belt Cleaner of FIG. 9E Fragmentary

Referring to the side view of FIG. 9E there is depicted an alternate means or method of mounting and arranging a scraper apparatus. As shown the support 16 carries depending arms 18 and the horizontal arms 20. A vibrator 24 carried by isolators 27 and 28 is carried by and on tubular member 29. The right end of arms 326 carry eye bolts 250 and nuts 252. Springs 254 are carried at their upper ends by bolts 250 and at its lower end is secured to a stirrup or hasp member 256. A support frame 258 has its left end pivotally retained by pillow blocks 260 which are mounted on shaft 262 carring the free turning roller 30. A scraper blade 264 is carried by and with frame 258 and spring 254 urges the scraper blade toward the belt 12.

In operation the scraper blade 264 is urged by the adjusted spring 254 against the underside of the return belt 12. The adjusted springs 254 hold the blade lightly against the belt 12 and the eye bolts 250 are tightened or loosened to increase or decrease the scraper engagement. The scraper blade 264 is carried by the frame 258 and at its left end is carried by pillow blocks 260 which are supported by and on shaft 262 which carries free turning roller 30. Preferably the spring tension is adjusted so that the scraper blade just engages belt sufficiently to vibrate and loosen up "dug in" or otherwise attached particles.

Description of the Belt Cleaner of FIG. 9F

Referring next and finally to FIG. 9F there is shown a belt cleaner similar to that shown in FIG. 9E. The depicted arrangment is similar to the immediately above described apparatus but instead of a scraper blade 264 there is provided a roller 266 carried on and by pillow blocks 268. The roller 266 is a free turning roller similar to roller 34 shown in FIGS. 9A and 9B above. In all other respects the vibrator 24, member 29, roller 30 and arms 326, eye bolts 250, nuts 252, springs 254, hasp 256, frame 258 and pillow blocks 260 are arranged and preform as in FIG. 9E above.

The several embodiments above described and shown in the drawings disclosed combinations in which the vibrated roller 30 is positioned for maximum vibratory effect on the bottom return of the conveyor belt 12. The resonant vibrated cleaning means associated with the downwardly extending arms may be a roller, a scraper blade or a combination thereof. Within the limits of this application many combinations are suggested and possible. The assembly and adjustable mounting follow generally the procedure as described in conjunction with FIGS. 1A, 1B and 2.

It is to be noted that the above-described and alternate embodiments of the belt cleaner have to be partially custom arranged for the belt to be accomodated. The material being conveyed has to be considered in that very tacky or sticky material such as wet clay may allow the use of only a scraper, as seen in FIG. 7A. Not to be overlooked is the bladed resonant roller of FIGS. 3A and 3B and the roller with eccentric discs as in FIGS. 5A and 5B. Where and when a roller and/or scraper cannot be used to remove the material from the outer surface of the belt 12, the apparatus of FIG. 7B may be used absent the scraper 88.

Any of the arrangements employing a resonant roller or scraper between the main roller 30 and the discharge pulley 10 may be used with the frame and arms. Springs are often employed. Where the conveyor frame is between the belts, the vibratory apparatus is arranged with arms 22 shortened, lengthened or eliminated as required or desired.

The following apparatus provides a basis for a method of cleaning a vibratory belt as follows: a method for vibratory belt cleaning of an endless conveyor belt as carried by a conveyor frame, said method including vibrating that return belt immediately adjacent to the discharge pulley to remove attracted particles from the carrying surface of the belt, said method for belt cleaning including the steps of providing a support means for the conveyor belt and frame; arranging a first pair of arm members of like length and pivotally retaining each of said arm members to and by the conveyor frame; securing a second pair of arm members by and below the first pair of arm members; supporting a variable speed and force vibrator by and on a support secured to the second pair of arm members; interposing vibration isolators between said first and second arm members and arranging these isolators so as to inhibit vibration transmittal from vibrator to the frame; carrying a shaft at each end by a support means which is attached to the second pair of arms at a point which is intermediate their length, said shaft adapted to accept and support a freely turning roller carried on and by this shaft, and vibrating this roller by the vibrator and disposing said roller so as to engage the inside surface and under extent of the conveyor belt at a determined position away from the discharge pulley; attaching cooperative means to the distal end of the second set of arms and vibrating additional cleaning means as carried by said cooperative means and resonantly transmitting to the conveyor belt the induced vibrations and adjustably arranging the vibratory apparatus so that the position of the vibrated roller is in engagement with the inside of the conveyor belt so that the roller is moved for permanent mounting on the frame after a maximum vibration point is selected to induce vibrations into the return extent of the conveyor belt and adjustably positioning the cooperative means carrying the additional vibrated cleaning means so that by and after adjusting, the cleaning means is brought into a light engagement with the return conveyor belt and adjustably positioning said cooperative means and away from the discharge pulley to produce a maximum vibration in that lower portion of the conveyor belt between the vibrated roller and the discharge pulley.

The mounting instructions as detailed for the assembly of FIG. 1 is used for all embodiments so as to vibrate the lower belt next to the discharge pulley at a selected maximum.

Terms such as "left", "right", "up", "down", "bottom", "top", "front", "back", "in", "out" and the like are applicable to the embodiments shown and described in conjunction with the drawings. These terms are merely for the purposes of description and do not necessarily apply to the position in which the resonant vibratory belt cleaner may be constructed or used.

While particular embodiments of the resonant belt cleaning apparatus have been shown and described it is to be understood the invention is not limited thereto since modifications may be made within the scope of the accompanying claims and protection is sought to the broadcast extent the prior art allows.

What is claimed is:

1. A vibratory belt cleaning apparatus for an endless conveyor belt as carried by a conveyor support frame, said apparatus disposed immediately adjacent a discharge pulley to remove attracted particles from the carrying surface of said belt as the belt is vibrated and moved on its return portion of movement, said belt cleaning apparatus including:
   (a) a support frame for the conveyor belt and pulley;
   (b) a first pair of forwardly extending arm members;
   (c) securing means for pivotally retaining said first pair of forwardly extending arm members to a selected and adjustably determined position on said support frame; said first pair of forwardly extending arm members carried by and below said securing means;
   (d) a second pair of forwardly extending arms disposed below and substantially parallel to said first pair of forwardly extending arms, this second pair of arms extending toward the discharge pulley;
   (e) vibration isolators interposed between said first and second pair of forwardly extending arms, these isolators arranged so as to inhibit vibration transmittal to said support frame;
   (f) a variable speed and force vibrator carried on and by a support member secured to the second pair of forwardly extending arm members;
   (g) a shaft carried at each end by bearing means secured to the support member and attached to the second pair of extending arms at a point which is intermediate their length, this shaft adapted to accept and support a first free turning roller carried on and by this shaft, this first free turning roller vibrated by the force vibrator and with this first free turning roller disposed to engage the inside surface and under extent of the conveyor belt at a determined position away and downstream from the discharge pulley;
   (h) means cooperatively associated with and depending from said second pair of forwardly extending arms and providing a second vibrated additional cleaning means for said return extent of belt, this second vibrated additional cleaning means adapted to engage the outer surface of the returning belt;
   (i) means for adjustably positioning the first freely turning roller so that the engagement with the inside of the conveyor belt and the vibratory actuation is at a maximum resonance and at said position the first pair of forwardly extending arms are permamently secured, and
   (j) means for adjustably positioning said second vibrated additional cleaning means so that vibratory actuation with the outside of the returning belt is made with a light engagement therewith, this second vibratory actuation adjustably positioned to determine a maximum resonance and at said position securing said second vibrated additional cleaning means.

2. A vibratory belt cleaning apparatus as in claim 1 in which the free turning roller is made with a smooth cylindrical outer surface, said roller freely turning in bearings carried by the downwardly extending arm members.

3. A vibratory belt cleaning apparatus as in claim 1 in which the free turning roller is made with a series of longitudinal blades carried on and supported by a shaft freely turning in bearings carried by the downwardly extending arm members.

4. A vibratory belt cleaning apparatus as in claim 1 which the free turning roller is made with a plurality of discs mounted and secured to a shaft so as to be substantially normal to said shaft which is freely turning in bearings carried by the downwardly extending arms, said shaft substantially normal to the travel of the conveyor belt.

5. A vibratory belt cleaning apparatus as in claim 4 in which the discs are so arranged that the discs provide an eccentric action of the discs on the belt.

6. A vibratory belt cleaning apparatus as in claim 1 in which the securing means for pivotally retaining said vibration apparatus includes a first pair of downwardly extending arms of like length.

7. A vibrating belt cleaning apparatus as in claim 1 in which the means cooperatively associated with the second pair of forwardly extending arms is a pair of adjustable, downwardly extending arm members which carry a second free turning roller.

8. A vibratory belt cleaning apparatus as in claim 1 in which the means cooperatively associated with and depending from second pair of forwardly extending arms is a second free turning roller that is in light engagement with the outer lower extent of the conveyor belt, this second roller positioned between the discharge conveyor roller and the first free turning roller in engagement with the inside of the conveyor belt.

9. A vibratory belt cleaning apparatus as in claim 1 in which the means cooperatively associated with and depending from said second pair of forwardly extending arms is an assembly containing a second free turning roller and a scraper blade and is an assembly substantially simultaneously in engagement with the outer surface of the conveyor belt.

10. A vibratory belt cleaning apparatus as in claim 1 in which the second pair of forwardly extending arm members are pivotally connected at one end to a pair of downwardly extending arm members and adjacent the distal end of the first pair of forwardly extending arm members there is provided a bias which is disposed to cooperate with said first and second pair of forwardly extending arm members to urge the second pair of arm members away from the lower extent of the conveyor belt.

11. A vibratory belt cleaning apparatus as in claim 10 in which the bias is a tension spring having one end secured to the first pair of forwardly extending arm members and with the other end of the spring secured to the pivotally connected second pair of forwardly extending arm members.

12. A vibratory belt cleaning apparatus as in claim 11 in which the second vibrated additional cleaning means is a second roller.

13. A vibratory belt cleaning apparatus as in claim 12 in which the second vibrated additional cleaning means includes the second roller which is in light engagement with the outer lower extent of the conveyor belt, this second roller disposed between the discharge conveyor roller and the first free turning vibration roller that is in engagement with the inside of the conveyor belt.

14. A vibratory belt cleaning apparatus as in claim 11 in which said second vibrated additional cleaning means is a blade member urged by said spring into a light engagement with the underside of the outer surface of the conveyor belt.

15. A vibratory belt cleaning apparatus as in claim 14 in which said second vibrated additional cleaning means includes an additional free turning roller carried by said downwardly extending arm members secured to the second pair of forwardly extending arms, said additional free turning roller disposed to engage the inner side of the conveyor belt and at a position that is substantially opposite the blade member.

16. A vibratory belt cleaning apparatus as in claim 10 in which the bias is a compression spring having one end carried by the first pair of forwardly extending arms and the other end adapted to cooperatively urge upwardly the pair of downwardly extending arm members associated with and carried by and movable with said second pair of forwardly extending arms.

17. A vibratory belt cleaning apparatus as in claim 16 which includes a second pair of downwardly extending arms each having a plurality of holes formed in the upper distal end of said arms, the formed holes normal to the plane of the lower extent of the conveyor belt and from one of these holes is supported a stud which is attached to each downwardly extending arm, the supporting of this stud including compression springs on said stud and on each side of the distal end of said second forwardly extending arm, this stud and the second downwardly extending arm positioned by adjusting a nut on a distal threaded end of said stud.

18. A vibratory belt cleaning apparatus as in claim 17 which each downwardly extending arm is adjustably carried by a block carried by and attached to said stud.

19. A vibratory belt cleaning apparatus as in claim 17 in which the spring bias includes adjusting means and the said second vibrated additional cleaning means on the underside of the conveyor belt is a freely turning second roller.

20. A vibratory belt cleaning apparatus as in claim 1 in which a pair of downwardly extending arm members are secured by a pivot to the conveyor support frame and the vibrator is substantially carried to and in a resonantly supportive condition by at least one tension spring which has one end secured to the conveyor support frame and the other end to said first pair of forwardly extending arm members.

21. A vibratory belt cleaning apparatus as in claim 1 in which the second pair of forwardly extending arm members also pivotally support an additional pair of downwardly extending arm members, these additional downwardly extending arm members biased toward the upper side of the conveyor belt, these additional arm members carrying the said second vibrated additional cleaning means.

22. A vibratory belt cleaning apparatus as in claim 1 in which the means cooperatively associated with the second pair of forwardly extending arms is a frame pivotally supported at one end by the support member for the vibrator and at its other end by a spring bias urging said second vibrated additional cleaning means toward and to the underside of the return extent of the conveyor belt.

23. A vibratory belt cleaning apparatus as in claim 22 in which one end of the pivotally supported frame is carried by pillow blocks which are arranged on a shaft which also carries the freely turning roller as it is in contact with the inner surface of the belt.

24. A vibratory belt cleaning apparatus as in claim 23 in which the spring bias includes adjusting means and said second vibrated additional cleaning means on the underside of the conveyor belt is a scraper carried by said frame.

* * * * *